United States Patent [19]

Baltensperger

[11] Patent Number: 4,657,099
[45] Date of Patent: Apr. 14, 1987

[54] TRACK-LAYING AUXILIARY THRUST VEHICLE

[76] Inventor: Eduard Baltensperger, Eichstrasse 176, Brütten, Switzerland

[21] Appl. No.: 751,499

[22] Filed: Jul. 3, 1985

[30] Foreign Application Priority Data

Jul. 5, 1984 [CH] Switzerland .......................... 3243/84

[51] Int. Cl.[4] ............................................. B62D 55/04
[52] U.S. Cl. ................................... 180/9.28; 180/9.3; 104/2
[58] Field of Search .......................... 180/9.1, 9.5, 9.21, 180/9.3, 9.46, 9.28

[56] References Cited

U.S. PATENT DOCUMENTS

| | | | |
|---|---|---|---|
| 1,729,374 | 9/1929 | Ehrhart | 180/9.28 |
| 4,125,271 | 11/1978 | Wiboltt et al. | 280/461 A |
| 4,174,757 | 11/1979 | Stedman | 180/9.46 |
| 4,204,583 | 5/1980 | Toyoura et al. | 180/9.28 |
| 4,541,498 | 9/1985 | Pitchford | 180/9.26 |
| 4,564,080 | 1/1986 | Pagett | 180/9.28 |

Primary Examiner—Richard A. Bertsch
Attorney, Agent, or Firm—Helfgott & Karas

[57] ABSTRACT

A track-laying auxiliary thrust unit is connectable to a steerable wheeled or skid-mounted vehicle to add thrust and reduce the per unit area force on the ground. Various couplings are disclosed for interconnecting the thrust unit with the vehicle. The thrust unit derives its primary power from the vehicle which it is assisting through hydraulic hoses, a mechanical connection or an electrical interconnection. Thrust units in accordance with the invention are particularly useful in agricultural contexts for towing large and heavy agricultural implements with a tractor of modest capability.

14 Claims, 10 Drawing Figures

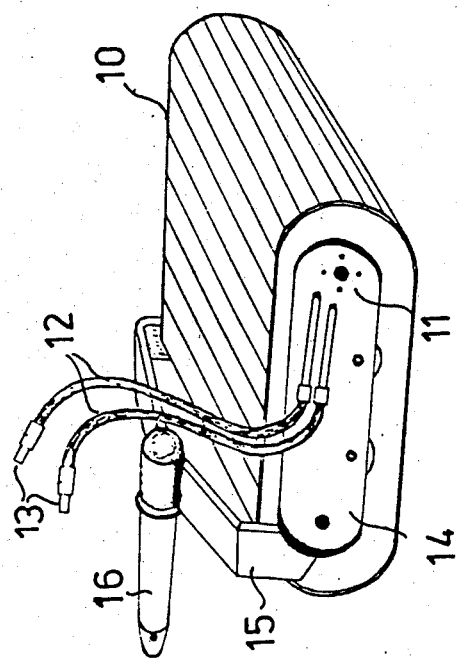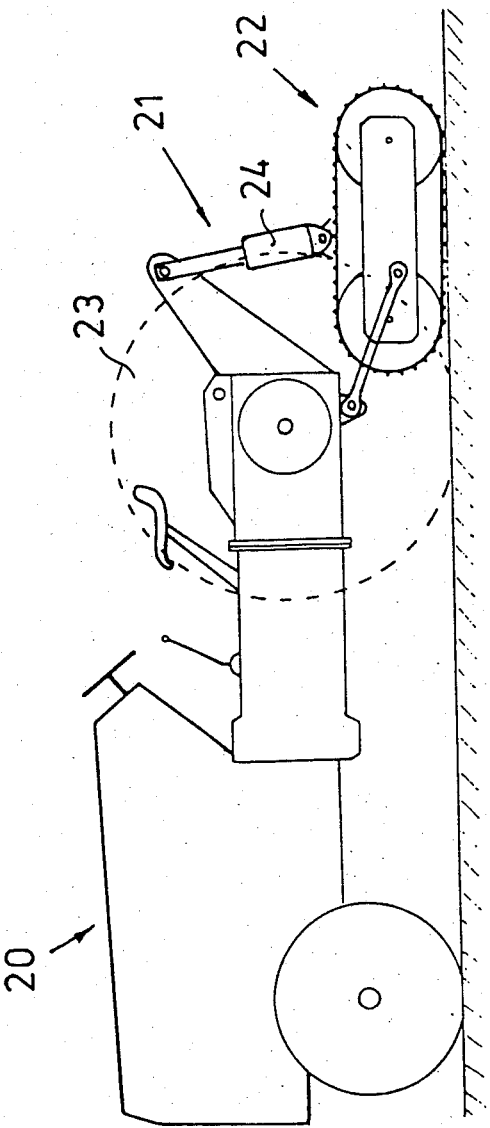
Fig.1
Fig.2

TRACK-LAYING AUXILIARY THRUST VEHICLE

This invention relates to an auxiliary drive apparatus for use with a power driven steerable vehicle to provide additional thrust for propelling the vehicle and any loads or tools with which the vehicle may be burdened, especially agricultural vehicles.

BACKGROUND OF THE INVENTION

Advancing mechanization of agriculture and the ever-increasing sizes of arable fields which are brought under cultivation in single units, together with larger and more powerful harvesters wherein several coupled-together implements must be pulled together across fields and up slopes, demands ever greater tractive effort from the tractor or other pulling vehicle. A modern tractor must be capable of exerting more than twice the previously required tractive capability than was previously required when cultivating the soil where deeper soil loosening is increasingly required and where it is simultaneously desired to use implements having a greater working width. As a result, larger and longer tractors have been built. It was intended to meet the above demands by having increasingly wider and higher (larger diameter) tires and, in part, with the help of engageable and disengageable four-wheel drives.

However, it has been found in practice that fields do not respond like hard-surfaces, stable roads where heavy loads can be pulled without difficulty by using powerful, heavy vehicles. The wet soil of a field is excessively compressed by high ground pressures per unit area and, as a result of the high "slip" necessarily caused by the great tractive effort of the drive wheels, the already compressed soil is kneaded which experience has shown to be highly damaging. It is known that such kneading causes serious damage to the soil structure.

In particular, the water retention capacity of the soil is destroyed as is the activity of soil organisms and bacteria. This leads to reduced yields and sickly plants which are plagged by pests and fungal diseases and which must then be treated with chemical substances which are prejudicial to the environment. Such treatment leads to environmental pollution including over-fertilization such that the runoff from fields adds excessive phosphates, nitrates and the like to fresh water bodies, resulting in damage to both human and animal users of these water supplies.

Heavy tractors have been equipped with caterpillar-type tracks for reducing the compression of the soil and to simultaneously increase the pulling power. However, such tractors are only suitable for very heavy work and cannot economically be used for light work.

Swiss Pat. No. 190,576 proposes making the vehicle wheels removable and replacing them with rocker arms with endless track bands or belts. In the case of a light tractor, having a total weight of 1700 kg or so, this does, in fact, reduce the ground pressure per unit area, but the pulling power is only slightly increased because its weight is too slow.

SUMMARY OF THE INVENTION

An object of the present invention is to provide means for increasing the pulling power of a light tractor, earthmoving machine, construction machine or cross-country vehicle without increasing the ground pressure per unit area.

A further object is to provide an auxiliary thrust unit for use with a wheeled vehicle by which the ground pressure per unit area is decreased and the total tractive effort exertable by the combination is substantially increased.

Briefly described, the invention comprises a thrust unit for use in combination with a steerable vehicle comprising a track-laying vehicle having a chassis, at least one endless track mounted on said chassis and means carried by said chassis for driving the track. Means connected to the chassis is provided for coupling the track-laying vehicle to the steerable vehicle adjacent the rear of the steerable vehicle and for transferring thrust produced by the track-laying vehicle to the steerable vehicle and for reducing the per unit area ground pressure of the steerable vehicle.

A tractor weighing 1700 to 2000 kg is the ideal vehicle for doing light work such as hay harvesting, spreading fertilizer and the like. For heavy work, a thrust unit in accordance with the invention can be coupled to the lighter machine. This thrust unit can be produced and used with either steel or rubber tracks. In this connection it should be mentioned that the term "caterpillar" is used herein in its generic sense to refer to an endless belt or band, or a plurality of links forming such a belt or band, wherein successive portions thereof are continuously and successively laid on the ground so that wheels can roll over those portions. The term "track laying" is regarded as a synonym for caterpillar. The thrust unit can have a dead weight of from about 500 kg to about 2000 kg and additional weights can be attached to it. By means of this additional unit the tractor-thrust unit combined weight increases to 2400 to 4000 kg which is the weight range necessary to carry out the previously mentioned heavy pulling tasks. However, the main advantage is that the tractor with the thrust unit has a very large ground-bearing surface. Because of this large bearing surface, which is equivalent to saying large adhesion or gripping surface, the ground pressure per unit area is drastically reduced to a pressure in the order of 200 to 300 $g/cm^2$ which represents a very important advantage when cultivating the soil as well as for other work.

Virtually no tracks are left behind in the loosened field soil by the tractor with the thrust unit. As a result of the large bearing surface against which the tractor thrusts during pulling, there is substantially no slip. Slip not only involves the soil kneading phenomenon mentioned before, but also represents power loss and leads to greater fuel consumption, as much as 40% or more. In a preferred embodiment, the thrust unit is arranged so that it can be raised at the end of the field when turning or for travelling on roads. In certain cases, the thrust unit can be placed between the tractor wheels from the rear and coupled to the tractor in that position. The unit can be driven by a hydraulic motor integrated into its chassis, linked to the moving parts by reduction gears. It can be driven forward and in reverse. The drive can alternatively be arranged to be mechanical as by a drive shaft, miter gears and reduction gears or it can be electrical.

The force application point is about 60 to 90 cm above the ground on the tractor which forms a lever arm causing pressure of the front wheels to be reduced and causing the rear wheels to be additionally loaded which means that a four-wheel drive vehicle is practically worthless in conjunction with the thrust unit. The thrust unit can take up the increased weight loading which would otherwise fall on the rear wheels and, as a result of the large ground bearing surface of the thrust unit together with the fact that it is driven together with the engine power of the tractor, the result is an enormously high tractive effort without slip and with minimum soil pressure.

BRIEF DESCRIPTION OF THE DRAWINGS

In order to impart full understanding of the invention, particularly advantageous embodiments thereof will be described with reference to the accompanying drawings, which form a part of this specification, and wherein:

FIG. 1 is a perspective view of a thrust unit in accordance with the invention;

FIG. 2 is a side elevation of a tractor with a thrust unit in accordance with the invention coupled thereto;

DETAILED DESCRIPTION OF PREFERRED EMBODIMENTS

Figure 3:
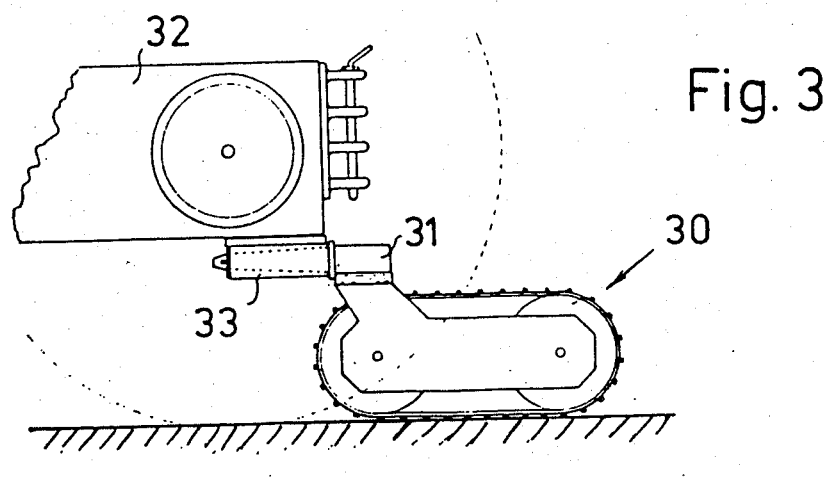
FIG. 3 is a side elevation of the thrust unit of FIG. 1 and a portion of a tractor showing a pin and sleeve coupling arrangement.

Referring first to FIG. 1, the thrust unit shown therein has an endless belt or band 10 which can be a rubber or steel link or chain or continuous tract which extends over substantially the entire width of the unit. The caterpillar belt is mounted on wheels in a frame or chassis 14 and is driven by a drive means, indicated generally at 11, such as a hydraulic motor powered from the hydraulic system of the tractor to which it will be attached by fluid under pressure supplied through hydraulic hoses 12 having couplings 13. A bow-shaped yoke member 15 extending over the endless track is attached to the chassis 14 and has a generally horizontal pin 16 aligned with the direction of travel. The pin is used for coupling the thrust unit to a vehicle to transfer thrust thereto. As shown in FIG. 3, the vehicle has a sleeve dimensioned to receive the pin. The yoke, pin and sleeve are constructed in a sufficiently sturdy manner such that the tractor, with its hydraulic drive, can guide and raise the thrust unit as is required when turning.

Instead of being driven hydraulically, the thrust unit can also be driven mechanically from the tractor by means of a power take-off of, alternatively, an electric drive is also possible. The drive speed should be regulated in such a way that the forward movement speed of the thrust unit corresponds to the travel speed of the tractor or other vehicle to which it is coupled for increasing the pulling power. It must be possible to drive the thrust unit drive motor both forward and backward.

FIG. 2 shows a tractor 20 with a thrust unit 22 coupled by means of a three-point suspension 21. The thrust unit is sufficiently narrow so that it can be positioned between the rear wheels 23 of the tractor. This arrangement is particularly favorable because it enables the thrust unit to take over part of the load of the drive wheels 23. The hydraulic lifting device 24 makes it possible to raise the thrust unit when turning and to control the degree of release of the pressure of the tractor rear wheels.

FIG. 3 illustrates the manner in which a thrust unit 30 equipped with a guide pin 31 as illustrated in FIG. 1 can be coupled to the gear unit 32 of the tractor. The gear unit is provided with a sleeve 33 into which the pin 31 can be inserted. The thrust unit can pivot about the longitudinal axis of the pin which makes it possible for the vehicles to individually adapt to variations in the surface. In order to reduce the ground pressure per unit area of the tractor, it is appropriate to construct the pin 31 so that it can be raised.

Figure 4:
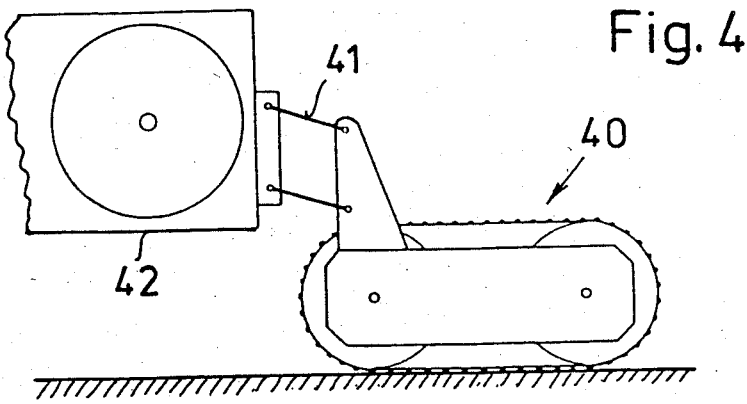
FIG. 4 is a side elevation schematically illustrating a parallelogram linkage coupling arrangement.

If the gear engine unit is not raisable, the thrust unit 40 can be suspended by means of a parallelogram connection 41 on gear unit 42 as shown in FIG. 4.

Figure 5:
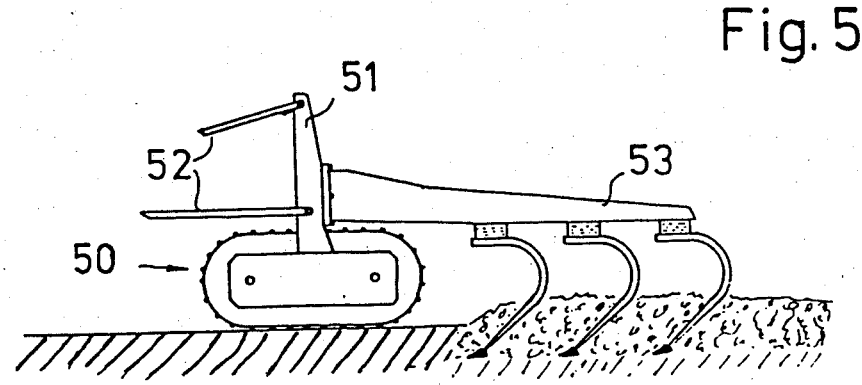
FIG. 5 is a schematic side elevation of a thrust unit connected to a cultivating implement.

FIG. 5 shows a thrust unit 50 provided with a bridge 51 to which are coupled both the connecting elements 52 of a three-point suspension to the tractor (not shown) and also to a cultivating implement 53. The attachment of the cultivator should be vertically adjustable so that it is possible to set the cultivation depth. If the thrust unit is raised by means of the tractor hydraulic system, the cultivating implement 53 is simultaneously raised.

Figure 6:
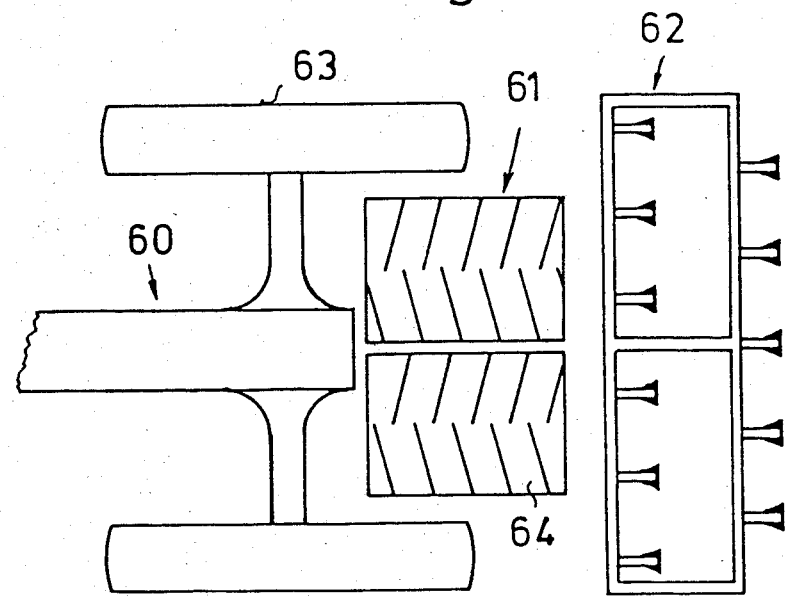
FIGS. 6 and 7 are schematic top plan views of tractors and different embodiments of thrust units coupled to a cultivating implement.
Figure 7:
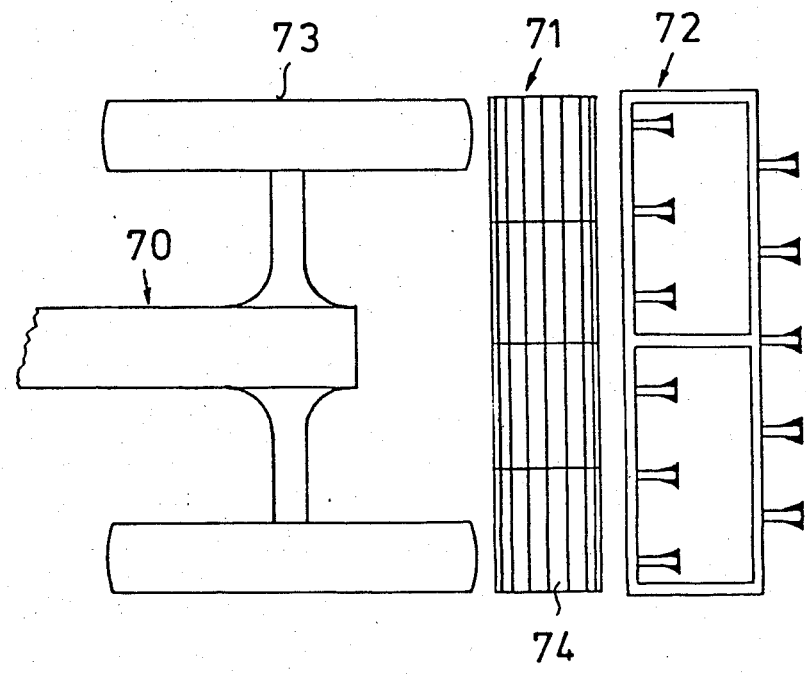

FIGS. 6 and 7 show schematic plan views of the combination of a tractor 60 and 70 with a thrust unit 61 or 71 coupled thereto and also connected to a cultivating 62 or 72, respectively. The coupling devices and power connections have been omitted for simplicity. As will be recognized, thrust unit 61 in FIG. 6 is sufficiently narrow so that it can be positioned between the drive wheels 63 of the tractor.

However, thrust unit 71 is wider and shorter and must therefore be positioned behind the drive wheels 73 of the tractor.

Thrust unit 61 has two parallel rubber belt caterpillars 64 which are provided with sloping thread members. Thrust unit 71 has four parallel steel caterpillar links or chains 74 or, alternatively, can be supplied with rubber caterpillar belts.

Figure 8:
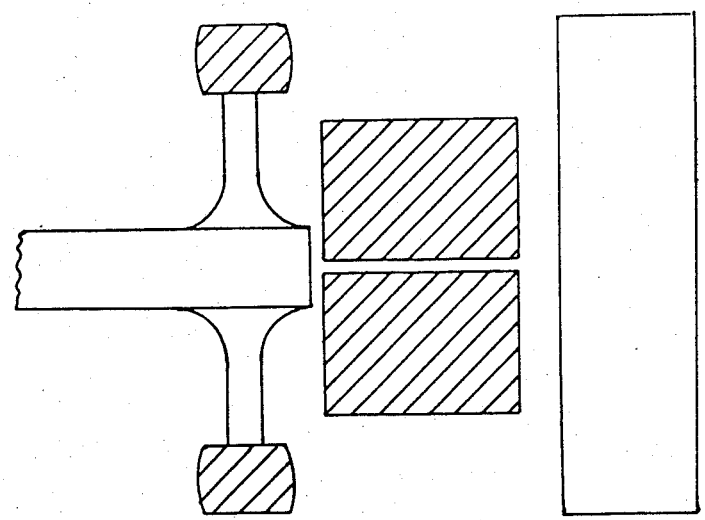
FIG. 8 is a diagram illustrating, in plan, the relative sizes of the ground-bearing surfaces of the tractor and thrust unit.

FIG. 8 is a diagram, as viewed from above, of the relative sizes of the bearing surfaces of tractor wheels 63 and thrust unit 61 interconnected in accordance with FIG. 6. It will be apparent that the bearing surface of the thrust unit is much larger than that of the tractor wheels so that the thrust unit can apply high thrust forces without any concern about slip.

Figure 9:
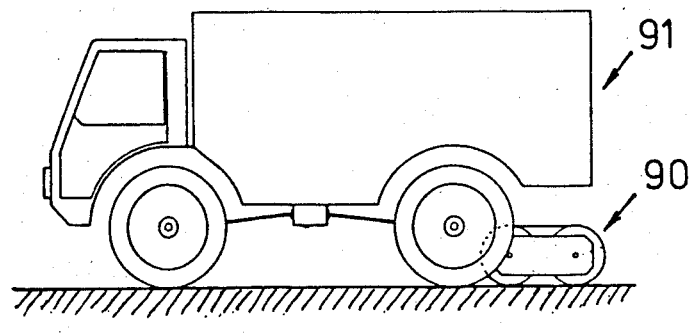
FIG. 9 is a schematic side elevation for a four-wheel driven vehicle, such as a cross-country vehicle, to which a thrust unit in accordance with the invention is attached.

FIG. 9 illustrates another possible use of a thrust unit 90 in which it increases the pulling and climbing power of a cross-country vehicle 91 which can, for example, be a military vehicle. The thrust unit is sufficiently narrow so that it can be positioned between the rear wheels of vehicle 91. The parallelogram connection illustrated in FIG. 4 can advantageously be used in this embodiment.

Figure 10:
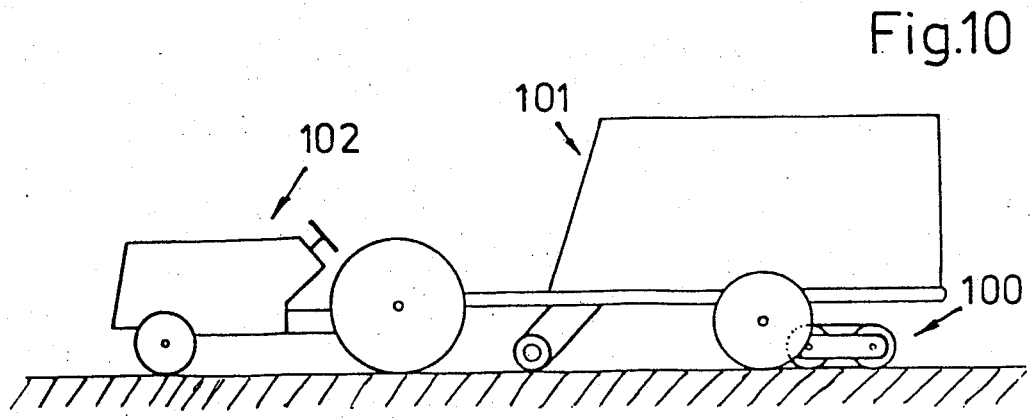
FIG. 10 is a schematic side elevation of a tractor coupled to a single-axle trailer attached to a thrust unit.

Finally, FIG. 10 shows a thrust unit 100 used in connection with a larger trailer 101 towed by a tractor 102. The thrust unit can be used to increase the pulling power of a relatively weak tractor, particularly if it must pull a heavily laden trailer up hill.

As will be recognized, the steerable wheeled vehicles described and illustrated can be equipped with skids or the like replacing the wheels, particularly in a snowy region, and can be operated in the same manner. as if equipped with wheels when coupled to a thrust unit in accordance with the invention.

While certain advantageous embodiments have been chosen to illustrate the invention, it will be understood by those skilled in the art that various changes and modifications can be made therein without departing from the scope of the invention as defined in the appended claims.

What is claimed is:

1. A thrust unit for use with a steerable vehicle comprising
a track-laying vehicle having a chassis, at least one endless track mounted on said chassis and means carried by said chassis for driving said track; and
means connected to said chassis for removably coupling said track-laying vehicle to the steerable vehicle to extend rearward of the rear wheels of said steerable vehicle and for transferring thrust produced by said track laying vehicle to said steerable vehicle land for reducing the per unit area ground pressure of said steerable vehicle.

2. A unit according to claim 1 wherein said steerable vehicle has rear wheels and said thrust unit has a width smaller than the distance between the rear wheels of said steerable vehicle so that said unit can be positioned between said wheels and extend rearward thereof and coupled to said steerable vehicle.

3. A unit according to claim 1 wherein said means for coupling includes a horizontal pin and a mating sleeve, one of said pin and sleeve being fixedly attached to said thrust unit chassis and the other thereof being attached to said steerable vehicle, whereby said thrust unit can rotate about the horizontal axis of said pin to accommodate unevenness of the ground.

4. A unit according to claim 1 wherein said coupling means includes a three point suspension mechanism.

5. A unit according to claim 1 wherein said coupling means includes linkage means forming a parallelogram connection and lifting means for elevating the end of said parallelogram attached to said unit.

6. A unit according to claim 1 and further comprising a cultivator tool and means for fixedly connecting said chassis to said tool.

7. A unit according to claim 1 wherein said at least one endless track extends substantially across the entire width of said chassis.

8. A unit according to claim 7 wherein said steerable vehicle includes means for generating power and said unit includes means for delivery power from said means for generating to said drive means on said unit; and means for controlling the delivery of power to substantially synchronize the speed of travel of said unit with said vehicle.

9. A unit according to claim 8 wherein said means for generating power is hydraulic.

10. A unit according to claim 8 wherein said means for generating power is mechanical.

11. A unit according to claim 8 wherein said means for generating power is electrical.

12. A unit according to claim 8 wherein said means for generating power on said steerable vehicle is exclusively used for providing power to said unit.

13. A unit according to claim 7 wherein said drive means comprises a motor carried by said chassis.

14. In combination, a steerable vehicle and a removable thrust unit, said vehicle comprising a vehicle body, a pair of front wheels and a pair of rear wheels; and thrust unit comprising a track-laying vehicle having a chassis, at least one endless track mounted on said chassis and means carried by said chassis for driving said track; and coupling means connected to said chassis for removably coupling said track-laying vehicle to said steerable vehicle such that said track-laying vehicle extends rearward of said rear wheels to reduce the pressure of the front wheels onto said track laying vehicle to reduce the per unit area ground pressure of said steerable vehicle.

* * * * *